Figure 1:
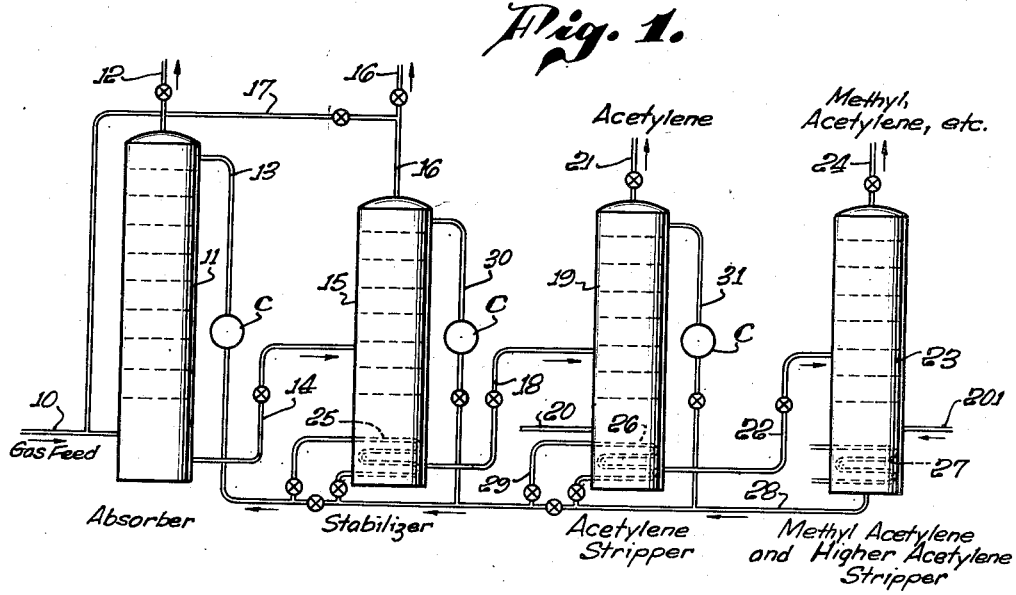

Dec. 11, 1956  A. L. KOHL ET AL  2,773,560
SEPARATION OF ACETYLENE COMPOUNDS
Filed May 18, 1953  2 Sheets-Sheet 1

ARTHUR L. KOHL,
FRED C. REISENFELD,
INVENTORS

BY

ATTORNEY.

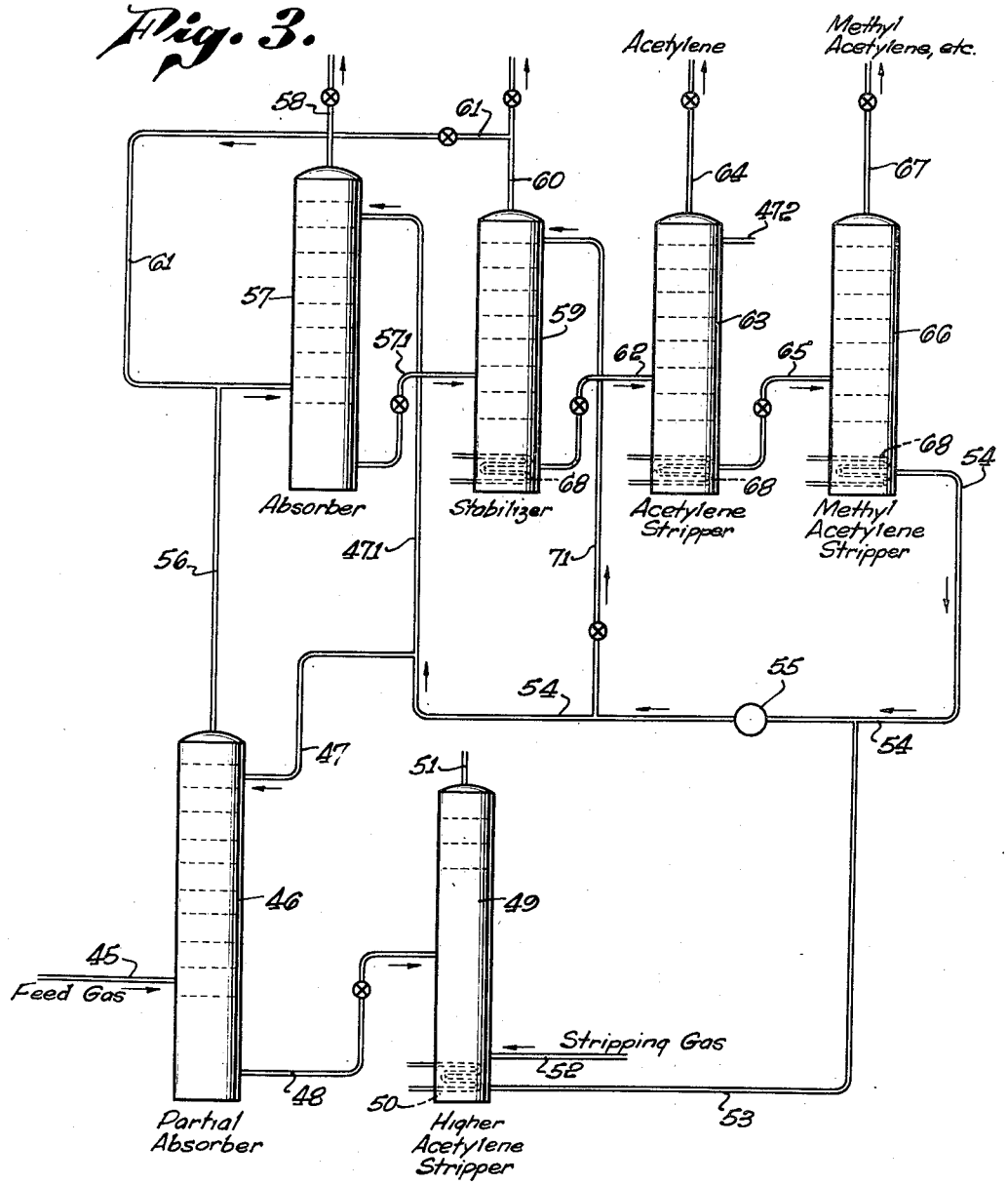

United States Patent Office 2,773,560
Patented Dec. 11, 1956

2,773,560
SEPARATION OF ACETYLENE COMPOUNDS

Arthur L. Kohl, Burbank, and Fred C. Riesenfeld, Hollywood, Calif., assignors to The Fluor Corporation, Ltd., Los Angeles, Calif., a corporation of California Application May 18, 1953, Serial No. 355,639

9 Claims. (Cl. 183—115)

This invention relates to a process for separating methyl acetylene and other higher acetylenic compounds from gas streams which also contain acetylene. Such streams are typically produced by thermal decomposition of hydrocarbon materials for the production of acetylene as well as by other processes generally characterized as "cracking." The process is also applicable to the purification of relatively concentrated acetylene containing streams and results in an acetylene product of extremely high purity.

Of the higher acetylenes, methyl acetylene shows volatility characteristics closest to acetylene and is most difficult to separate by presently available methods. We have now found that certain specific organic liquids possess the characteristic of high selectivity for methyl acetylene relative to acetylene and, in addition, exhibit other desirable characteristics such as low vapor pressure, chemical stability and chemical inertness to acetylene and its homologues. One of the principal advantages of the solvents which we propose is that they can be used elsewhere in the process to absorb acetylene and thus eliminate the necessity for utilizing two solvents. Chemicals which are generally suitable for the absorption of acetylene are not satisfactory for the separation of methyl acetylene because of low degree of selectivity and other undesirable characteristics.

The solvents contemplated by the invention comprise the class of alkyl ethers of diethylene glycol as, for example, diethylene glycol monomethyl ether, diethylene glycol monoethyl ether, diethylene glycol diethyl ether and diethylene glycol monobutyl ether. The capacity and selectivity of these materials is presented in the following table.

| Solvent | Methyl Acetylene Solubility | Acetylene Solubility | Ratio |
|---|---|---|---|
| Diethylene glycol monomethyl ether | 34.9 | 11.3 | 3.09 |
| Diethylene glycol monoethyl ether | 27.1 | 8.7 | 3.11 |
| Diethylene glycol diethyl ether | 49.3 | 11.2 | 4.40 |
| Diethylene glycol monobutyl ether | 31.6 | 8.3 | 3.81 |

In the above table the solubilities are expressed in terms of volumes of gas per unit volume of solution with the gas volumes measured at 0° C. and 760 mm. of mercury pressure, the solubility being measured at 25° C. with the solute gas partial pressure placed at 760 mm.

In contrast with the tabulated data, while there are equally good known acetylene solvents, their selectivities with regard to methyl acetylene are so considerably lower than that of any of the diethylene glycol ethers listed as to render them inferior. Because of the relatively high molecular weight of the diethylene glycol ethers, they all possess extremely low vapor pressure characteristics and are admirably suited for use in the contacting of large volumes of gases as losses due to vaporization are extremely small. In general, a suitable solvent for use in this process should have an atmospheric boiling point in excess of 175° C. (diethylene glycol monoethyl ether has a boiling point of 195° C.).

The separation of methyl acetylene and other higher acetylenes from gases containing acetylene using the solvents which we propose can be accomplished by different specific methods. In one embodiment of our invention the gas stream is contacted with a stream of solvent in a counter-current contacting device such as a bubble cap column; the quantity of liquid to this column being regulated so that essentially all of the acetylene, methyl acetylene and other high acetylenes are absorbed, while other less soluble gases (such as ethylene and carbon dioxide) which may be present in the feed gas pass through unabsorbed. The solution from this column is subjected to a selective stripping operation which takes advantage of the difference in relative volatility of the various dissolved gases.

For example, the solution may be passed first into a solution stabilizer column in which a limited amount of stripping is made to occur by such means as decreasing the pressure, increasing the solution temperature, or admitting a stripping gas. The gaseous effluent from this first stripping operation may be recontacted with a small stream of lean solution to reabsorb acetylenic gases or the entire stripped gas may be recycled or reused in the process. This first stripping step serves to remove any such light gases as hydrogen, ethylene or carbon dioxide which may have been absorbed in the solution. The stabilized solution may then be processed in a second stripping operation in such a manner that purified acetylene is obtained as a gas while methyl acetylene and higher acetylenes, because of their considerably lower volatility, are retained in the solution. These are stripped in a third operation where again, selective stripping procedures may be employed to separate the methyl acetylene from the higher acetylenes. In any of the stripping operations described above the gas may be released from the solution by the use of decreased pressure, increased temperature, the admission of a stripping gas or any combination of these means. Since the principles of fractional separation or stripping in accordance with Henry's and Dalton's laws are well known and in general chemical engineering practice, and since the selection of useable pressure, temperature, or partial pressure effects for our stripping stages involve no critical factors or considerations other than establishing stripping conditions to effect the separation of acetylene and methyl acetylene, it is unnecessary to go further into the applicable theory or practice of stripping. Rectification of any gaseous effluent from a stripping zone may be accomplished by contacting this gas with a small stream of lean solution in order to increase the selectivity of the operation by reabsorbing any of the less volatile components which may be released.

In another embodiment of our invention, the gas stream is first contacted with a relatively small stream of solvent so that only heavier acetylenic components are absorbed. This absorption operation may be conducted so that essentially all of the methyl acetylene is absorbed, in which case some acetylene will also be taken up by the solution and require separation in the stripping stage, or the absorption may be conducted so that essentially no acetylene is absorbed, in which case some methyl acetylene will also pass through the column and require separation from the acetylene by selective stripping when the latter is absorbed in a subsequent absorption step. When essentially all of the methyl acetylene is absorbed, the small stream of solution from this first absorption step may be first subjected to a stabilization step to remove the acetylene and less soluble gases. When the absorption is conducted to minimize the absorption of acetylene no stabilization is required and the solution may be stripped by conventional means to remove the absorbed higher acetylenes. In the latter case, methyl acetylene will be removed from the gases in subsequent absorption operations in which all or a portion of the acetylene will also be absorbed. The solution from this operation would then be stripped of purified acetylene in a first stage and of methyl acetylene in a second stripping operation.

Figure 2:
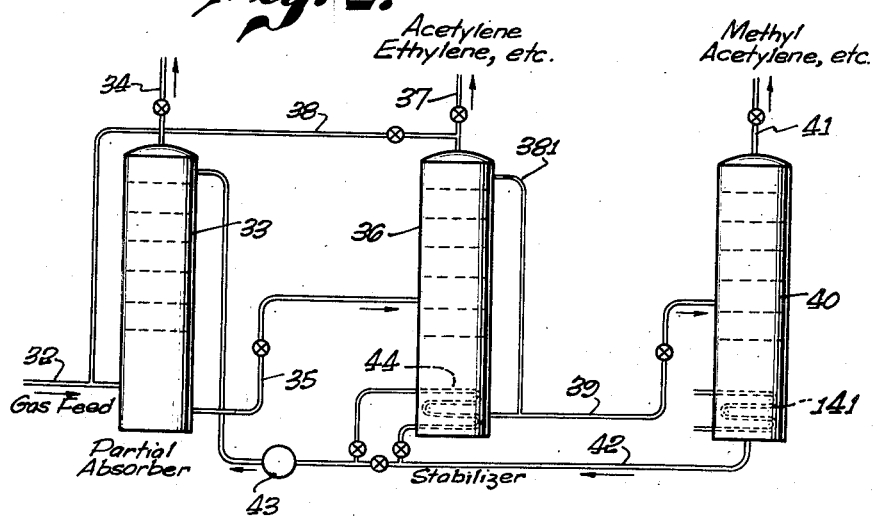

The invention will be understood more fully from the following detailed description of certain illustrative embodiments as shown by the accompanying and essentially flow sheet drawings, in which:

Fig. 1 is a view illustrating a system designed particularly for the separation of high purity acetylene and the separate recovery of methyl acetylene and any higher acetylenes present in the gas feed;

Fig. 2 illustrates a variational method directed to the recovery of methyl acetylene and any higher acetylenes in the feed, and the antecedant separation of acetylene together with other components of greater volatility than methyl acetylene; and Fig. 3 illustrates a further variational form of the invention distinguished from the Fig. 1 and Fig. 2 systems in the respect, among others, of subjecting the feed gas to preliminary treatment in a partial absorber for the removal of higher acetylenes.

Referring first to Fig. 1, the feed gas introduced to the system through line 10 may be assumed to comprise a mixture of cracked hydrocarbon gases containing at least $C_1$ and $C_2$ hydrocarbons, carbon dioxide, hydrogen, and acetylenes including acetylene and methyl acetylene, and perhaps also acetylenes higher in the acetylene series than methyl acetylene. The feed gas is introduced to an absorber 11 which may be of a bubble plate type column wherein the gas flows upwardly to the outlet line 12 in intimate contact with a down-flowing stream of lean absorbent returned from the stripping stages through line 13, as will later appear. The absorbent will consist essentially of any or a mixture of the aforementioned alkyl ethers of diethylene glycol, of which the mono methyl ether may be taken as typical. The absorber 11 will be operated under conditions readily obtainable by those familiar with the art, resulting in absorption by the lean absorbent of at least the bulk of the acetylene, methyl acetylene and higher acetylene content of the gas.

From the absorber 11 the rich solution is discharged through line 14 into stabilizer 15 which is operated under reduced pressure, increased temperature, or combination thereof, to effect the removal through the outlet 16 of fixed gases and higher volatility compounds such as hydrogen, carbon dioxide, ethylene and so forth. All or a portion of the stripped gases and vapors may be returned to the gas feed through line 17 for repassage through the absorber.

Leaving the stabilizer, the absorbent passes through line 18 into the acetylene stripper 19 which is operated under such conditions as reduced pressure, increased temperature, or the use of a stripping vapor introduced through line 20, or a combination of these effects, to drive off substantially all the acetylene which is recovered in high degree of purity through the outlet line 21.

The acetylene-free absorbent then passes through line 22 into stripper 23 within which the operating conditions are further altered with respect to pressure, temperature or the use of a stripping medium through line 201, or a combination of any of these, to drive off the methyl acetylene and higher acetylenes for product recovery through line 24. Bottom coils 25, 26 and 27 may be used as base heaters in the stabilizing and stripping columns, and may be supplied with heating fluid from any suitable sources. In the interest of heat economy, the lean absorbent from the base of the methyl acetylene stripper 23 may be returned via lines 28 and 29 through coils 26 and 25, finally to be returned through line 13 to the absorber 11. Small side streams of the lean absorbent may be used through lines 30 and 31 as reflux in the columns 15 and 19. Coolers C may be used as required to cool the reflux streams to columns 15 and 19, and the lean solution stream to absorber 11.

Fig. 2 illustrates a system wherein the gas feed is introduced through line 32 into a partial absorber 33, which is operated under temperature, pressure and absorbent flow rate conditions intended to retain in the rich absorbent, methyl acetylene and any higher acetylenes present in the gas feed. Accordingly, the gas going to the outlet line 34 will be substantially free of methyl acetylene and higher acetylenes, and will contain acetylene if separate recovery of acetylene from the system may not be necessary. From the partial absorber the rich absorbent flows through line 35 into stabilizer 36 which operates under conditions such that acetylene, ethylene and other components lower boiling than methyl acetylene, are taken off through line 37. All or a portion of the released gases may be recycled through the absorber by way of line 38. In order to minimize losses of methyl acetylene from the solvent, a small stream of lean solution may be introduced into the stabilizer through line 381.

From the stabilizer, the partially denuded absorbent flows through line 39 to stripper 40 wherein methyl acetylene and any higher acetylenes are driven off for recovery through line 41. The lean absorbent heated by the stripper bottom heater 141 may be returned through line 42 and cooler 43 directly to the absorber, or a portion of the absorbent may be returned through the stabilizer bottom coil 44.

In accordance with the system illustrated in Fig. 3, the feed gas in line 45 enters a partial absorber 46 fed with lean absorbent through line 47, which is operated under conditions such that the absorbent retains predominantly acetylenes higher in the series than methyl acetylene. The solution is discharged through line 48 into stripper 49 which may have a bottom heater 50 and is so operated as to drive off the higher acetylenes through line 51. Ordinarily it may be desirable to employ stripping gas introduced through line 52. The lean absorbent may be taken through line 53 for introduction to line 54 ahead of the cooler 55.

From the partial absorber the gas effluent which, as explained, is substantially free of acetylenes higher than methyl acetylene, is taken through line 56 into absorber 57 which is operated under conditions effecting the separation and release through outlet 58 of a gas mixture essentially free of acetylene and methyl acetylene. From the absorber, the rich solution flows through line 571 to the stabilizer 59 operating to separate and release through line 60, and if desired for return to the absorber 57 through line 61, gases of components of higher volatility than acetylene. The rich solution passes from the stabilizer through line 62 into the acetylene stripper 63 from which product acetylene is recovered through line 64. Lean solvent may be admitted to the top of column 63 through line 472 to obtain higher acetylene purity. The partially denuded absorbent then discharges through line 65 into stripper 66 from which methyl acetylene is recovered through line 67. The stabilizer and strippers may have bottom heating coils 68 to which heating fluid may be supplied as mentioned with respect to the previously described systems. From stripper 66, the lean absorbent is returned through line 54 and cooler 55 and lines 47 and 471 to the absorbers 46 and 57. A portion of the cooled lean absorbent may be used through line 71 as reflux to the stabilizer 59 and the acetylene stripper 63.

We claim:

1. The process of separately recovering acetylene-containing and methyl acetylene-containing gases from a gaseous mixture thereof containing other gaseous constituents, that comprises contacting said mixture in an absorption zone with an alkyl ether of diethylene glycol absorbent in which the alkyl radical is of the class consisting of alkyl groups within the 1 to 4 carbon atom range and absorbing acetylene and methyl acetylene therein, said absorbent having a boiling temperature in excess of 175° C., passing the absorbent into a first stripping zone and therein separating the bulk of the acetylene from the absorbent, and passing the residual absorbent into a second zone and therein separating the bulk of the methyl acetylene from the absorbent.

2. The process of separately recovering acetylene-containing and methyl acetylene-containing gases from a gaseous mixture thereof containing other gaseous constituents, that comprises contacting said mixture in an absorption zone with an alkyl ether of diethylene glycol absorbent in which the alkyl radical is of the class consisting of alkyl groups within the 1 to 4 carbon atom range and absorbing acetylene and methyl acetylene therein, said absorbent having a boiling temperature in excess of 175° C., passing the absorbent into a first stripping zone and therein separating the bulk of the acetylene from the absorbent, passing the residual absorbent into a second zone and therein separating the bulk of the methyl acetylene from the absorbent, and withdrawing the absorbent from said second zone and returning it to said absorption zone.

3. The process of separately recovering acetylene-containing and methyl acetylene-containing gases from a gaseous mixture thereof containing other gaseous constituents, that comprises contacting said mixture in an absorption zone with an alkyl ether of diethylene glycol absorbent in which the alkyl radical is of the class consisting of alkyl groups within the 1 to 4 carbon atom range and absorbing acetylene and methyl acetylene therein, said absorbent having a boiling temperature in excess of 175° C., passing the absorbent into a first stripping zone and therein separating the bulk of the acetylene from the absorbent, passing the residual absorbent into a second zone and therein separating the bulk of the methyl acetylene from the absorbent, and withdrawing the absorbent from said second zone and passing it in heat exchange relation with the absorbent at a location between the absorption zone and the first stripping zone and thence into said absorption zone.

4. The process of separately recovering acetylene-containing and methyl acetylene-containing gases from a gaseous mixture thereof containing other gaseous constituents, that comprises contacting said mixture in an absorption zone with an alkyl ether of diethylene glycol absorbent in which the alkyl radical is of the class consisting of alkyl groups within the 1 to 4 carbon atom range and absorbing acetylene and methyl acetylene therein, said absorbent having a boiling temperature in excess of 175° C., passing the absorbent into a stabilizing zone and therein removing impurities less soluble in the absorbent than the acetylenes, then passing the absorbent into a first stripping zone and therein separating the bulk of the acetylene from the absorbent, and passing the residual absorbent into a second zone and therein separating the bulk of the methyl acetylene from the absorbent.

5. The process of separately recovering acetylene-containing and methyl acetylene-containing gases from a gaseous mixture thereof containing other gaseous constituents, that comprises contacting said mixture in an absorption zone with an alkyl ether of diethylene glycol absorbent in which the alkyl radical is of the class consisting of alkyl groups within the 1 to 4 carbon atom range and absorbing acetylene and methyl acetylene therein, said absorbent having a boiling temperature in excess of 175° C., passing the absorbent into a stabilizing zone and therein removing impurities less soluble in the absorbent than the acetylenes, then passing the absorbent into a first stripping zone and therein separating the bulk of the acetylene from the absorbent, passing the residual absorbent into a second zone and therein separating the bulk of the methyl acetylene from the absorbent, and withdrawing the absorbent from said second zone and returning it to said absorption zone.

6. The process of separately recovering acetylene-containing and methyl acetylene-containing gases from a gaseous mixture thereof containing other gaseous constituents, that comprises contacting said mixture in an absorption zone with an alkyl ether of diethylene glycol absorbent in which the alkyl radical is of the class consisting of alkyl groups within the 1 to 4 carbon atom range and absorbing acetylene and methyl acetylene therein, said absorbent having a boiling temperature in excess of 175° C., passing the absorbent into a stabilizing zone and therein removing impurities less soluble in the absorbent than the acetylenes, then passing the absorbent into a first stripping zone and therein separating the bulk of the acetylene from the absorbent, passing the residual absorbent into a second zone and therein separating the bulk of the methyl acetylene from the absorbent, and withdrawing the absorbent from said second zone and returning it separately to said absorption and stabilizing zones.

7. The process of separately recovering acetylene-containing and methyl acetylene-containing gases from a gaseous mixture thereof containing other gaseous constituents, that comprises contacting said mixture in an absorption zone with an alkyl ether of diethylene glycol absorbent in which the alkyl radical is of the class consisting of alkyl groups within the 1 to 4 carbon atom range and absorbing acetylene and methyl acetylene therein, said absorbent having a boiling temperature in excess of 175° C., passing the absorbent into a first stripping zone and therein separating the bulk of the acetylene from the absorbent, passing the residual absorbent into a second zone and therein separating the bulk of the methyl acetylene from the absorbent, heating the absorbent in said second zone, and finally removing the absorbent, cooling it, and returning the absorbent to said absorption zone.

8. The process of separately recovering acetylene-containing and methyl acetylene-containing gases from a gaseous mixture thereof containing other gaseous constituents, that comprises contacting said mixture in an absorption zone with an alkyl ether of diethylene glycol absorbent in which the alkyl radical is of the class consisting of alkyl groups within the 1 to 4 carbon atom range and absorbing acetylene and methyl acetylene therein, said absorbent having a boiling temperature in excess of 175° C., passing the absorbent into a stabilizing zone and therein removing impurities less soluble in the absorbent than the acetylenes, then passing the absorbent into a first stripping zone and therein separating the bulk of the acetylene from the absorbent, passing the residual absorbent into a second zone and therein separating the bulk of the methyl acetylene from the absorbent, heating the absorbent in said second zone, and finally removing the absorbent, cooling it, and returning separate streams of the cooled absorbent to the stabilizing and absorption zones.

9. The process of separately recovering acetylene and methyl acetylene from a mixture thereof, that comprises introducing said mixture and an alkyl ether of diethylene glycol absorbent in which the alkyl radical is of the class consisting of alkyl groups within the 1 to 4 carbon atom range into a separating zone, said absorbent having a boiling temperature in excess of 175° C., maintaining in said zone temperature and pressure conditions causing the acetylene to separate from the absorbent and the methyl acetylene to remain dissolved therein, separately withdrawing the acetylene and absorbent from said zone, and recovering the methyl acetylene from the absorbent.

References Cited in the file of this patent

UNITED STATES PATENTS

| | | |
|---|---|---|
| 1,854,141 | Horsley | Apr. 12, 1932 |
| 1,965,100 | Groll et al. | July 3, 1934 |
| 2,048,838 | Carter et al. | July 28, 1936 |
| 2,146,448 | Scott et al. | Feb. 7, 1939 |
| 2,180,496 | Balcar | Nov. 21, 1939 |
| 2,206,490 | Tramm et al. | July 2, 1940 |
| 2,217,429 | Balcar | Oct. 8, 1940 |
| 2,440,493 | Shipley J. | Apr. 27, 1948 |
| 2,566,136 | Morrell | Aug. 28, 1951 |
| 2,714,940 | Milligan | Aug. 9, 1955 |

FOREIGN PATENTS

| | | |
|---|---|---|
| 386,052 | Great Britain | Jan. 12, 1933 |
| 415,377 | Great Britain | Aug. 17, 1934 |
| 580,922 | Great Britain | Sept. 25, 1946 |